United States Patent
Pillai et al.

(10) Patent No.: US 10,311,021 B1
(45) Date of Patent: Jun. 4, 2019

(54) SYSTEMS AND METHODS FOR INDEXING BACKUP FILE METADATA

(75) Inventors: Biju Pillai, Pune (IN); Gaurav Makin, Roseville, MN (US); Nilesh Telang, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 1486 days.

(21) Appl. No.: 13/368,692

(22) Filed: Feb. 8, 2012

(51) Int. Cl.
*G06F 16/11* (2019.01)
*G06F 16/13* (2019.01)

(52) U.S. Cl.
CPC .......... *G06F 16/128* (2019.01); *G06F 16/137* (2019.01)

(58) Field of Classification Search
CPC ............. G06F 11/1446; G06F 11/1448; G06F 11/1453; G06F 17/30088; G06F 17/30336; G06F 16/128; G06F 16/137
See application file for complete search history.

(56) References Cited

U.S. PATENT DOCUMENTS

| | | | | |
|---|---|---|---|---|
| 5,852,822 | A * | 12/1998 | Srinivasan | G06F 17/30327 707/4 |
| 6,449,613 | B1 * | 9/2002 | Egolf | G06F 17/30949 |
| 7,668,884 | B2 * | 2/2010 | Prahlad | G06F 3/0605 707/672 |
| 7,831,789 | B1 * | 11/2010 | Per et al. | 711/162 |
| 7,933,870 | B1 * | 4/2011 | Webster | G06F 16/178 707/638 |
| 8,190,836 | B1 * | 5/2012 | Zheng et al. | 711/162 |
| 8,306,948 | B2 * | 11/2012 | Chou et al. | 707/610 |
| 2002/0059281 | A1 * | 5/2002 | Watanabe et al. | 707/100 |
| 2006/0041726 | A1 * | 2/2006 | Steubing | G06F 11/1456 711/162 |
| 2006/0075294 | A1 * | 4/2006 | Ma et al. | 714/13 |
| 2006/0277180 | A1 * | 12/2006 | Okamoto | G06F 17/30566 |
| 2007/0050423 | A1 * | 3/2007 | Whalen et al. | 707/200 |
| 2010/0070725 | A1 * | 3/2010 | Prahlad | G06F 11/1453 711/162 |
| 2010/0250858 | A1 * | 9/2010 | Cremelie et al. | 711/136 |
| 2011/0161299 | A1 * | 6/2011 | Prahlad | G06F 17/30091 707/649 |
| 2012/0036574 | A1 * | 2/2012 | Heithcock | G06F 11/1466 726/19 |
| 2014/0222824 | A1 * | 8/2014 | Joshi | G06F 17/30321 707/741 |

OTHER PUBLICATIONS

Symantec Backup Exec 12.5 for Windows Servers, https://origin-symwisedownload.symantec.com/resources/sites/SYMWISE/content/live/SOLUTIONS/63000/TECH63215/en_US/308400.pdf, selected pages (4 pp. provided), 2008 (Year: 2008).*

* cited by examiner

*Primary Examiner* — Marc S Somers
(74) *Attorney, Agent, or Firm* — FisherBroyles, LLP

(57) ABSTRACT

A computer-implemented method for indexing backup file metadata may include 1) identifying a request to perform a full backup of a volume, 2) identifying a file metadata index for previous backups of the volume, 3) adding a current key uniquely identifying the file within the full backup and an identifier of the full backup to the file metadata index, 4) comparing the current key to the file metadata index to determine whether the current key is represented in the file metadata index, and 5) adding file metadata to the file metadata index for each file within the volume that is uniquely represented by the current key of the file within the file metadata index. Various other methods, systems, and computer-readable media are also disclosed.

20 Claims, 6 Drawing Sheets ent backup of the volume of data, and, in response to the subsequent request, for each identified file within the volume of data subject to the incremental backup, 2) generating a key uniquely identifying the identified file within the volume of data and 3) creating a new record including the key, an identifier of the incremental backup, and file metadata for the identified file within the file metadata index.

SYSTEMS AND METHODS FOR INDEXING BACKUP FILE METADATA

BACKGROUND

In the digital age, organizations increasingly rely on digitally-stored data. To protect against data loss, an organization may use a backup system to back up important data. Traditional backup systems may periodically create a full backup by capturing all files of a volume. Between full backups, a backup system may capture intermediate backups, referred to as incremental backups, which include files that have changed since the previous incremental or full backup. An incremental backup may be orders of magnitude smaller and faster than a full backup.

Unfortunately, backup systems may consume significant amounts of computing resources. For instance, a full backup may include millions of files, and a traditional backup system may store and index the metadata of each file in a backup. As traditional backup systems may create frequent (e.g., weekly) full backups of a volume, the indexes of backed up file metadata alone may consume significant amounts of storage space. Furthermore, because file metadata may infrequently change between full backups, a large portion of the information in file metadata indexes may be duplicative. Accordingly, the instant disclosure identifies and addresses a need for additional and improved systems and methods for indexing backup file metadata.

SUMMARY

As will be described in greater detail below, the instant disclosure generally relates to systems and methods for indexing backup file metadata by generating keys based on file metadata for file metadata index records to ensure only a single instance of each version of the metadata of a file is stored across backups of a volume. In one example, a computer-implemented method for indexing backup file metadata may include 1) identifying a request to perform a full backup of a volume of data, and, in response to the request, 2) identifying a file metadata index for a plurality of previous backups of the volume of data, each file metadata record within the file metadata index including a key uniquely identifying a corresponding file within a previous backup in the plurality of previous backups, an identifier of the previous backup, and file metadata of the corresponding file at the time of the previous backup, and, for each file within the volume of data, 3) adding a current key uniquely identifying the file within the full backup and an identifier of the full backup to the file metadata index and 4) comparing the current key to the file metadata index to determine whether the current key is represented in the file metadata index, and 5) adding file metadata to the file metadata index for each file within the volume of data that is uniquely represented by the current key of the file within the file metadata index.

In some examples, the computer-implemented method may also include 1) identifying a first request to perform a first full backup of the volume of data, and, in response to the first request, for each targeted file within the volume of data for the first full backup, 2) generating an original key uniquely identifying the targeted file within the volume of data and 3) creating a record including the original key, an identifier of the first full backup, and file metadata for the targeted file within the file metadata index. In these examples, the computer-implemented method may further include 1) identifying a subsequent request to perform an incremental backup of the volume of data, and, in response to the subsequent request, for each identified file within the volume of data subject to the incremental backup, 2) generating a key uniquely identifying the identified file within the volume of data and 3) creating a new record including the key, an identifier of the incremental backup, and file metadata for the identified file within the file metadata index.

In some examples, the file metadata index may include a plurality of subindices. In these examples, comparing the current key to the file metadata index may include selecting a subindex from the plurality of subindices based on the current key and comparing the current key to the subindex. Selecting the subindex may include generating a hash of the current key and selecting the subindex by applying a mapping function to the hash. In some embodiments, the key may include at least one of a file path of the corresponding file, a modification time of the corresponding file, and an owner name of the corresponding file.

In one example, the computer-implemented method may also include performing the full backup in response to the request and associating the full backup with the file metadata index. In this example, the computer-implemented method may also include receiving a restoration request to restore the volume of data from the full backup and, in response to the restoration request, 1) restoring each file within the volume of data from the full backup and 2) restoring file metadata for each file within the volume of data from the file metadata index.

In one embodiment, a system for implementing the above-described method may include 1) an identification module programmed to identify a request to perform a full backup of a volume of data and, in response to the request, identify a file metadata index for a plurality of previous backups of the volume of data, each file metadata record within the file metadata index comprising a key uniquely identifying a corresponding file within a previous backup in the plurality of previous backups, an identifier of the previous backup, and file metadata of the corresponding file at the time of the previous backup, 2) a key module programmed to, for each file within the volume of data, add a current key uniquely identifying the file within the full backup and an identifier of the full backup to the file metadata index, 3) a comparison module programmed to compare the current key to the file metadata index to determine whether the current key is represented in the file metadata index, and 4) an addition module programmed to add file metadata to the file metadata index for each file within the volume of data that is uniquely represented by the current key of the file within the file metadata index. The system may also include at least one processor configured to execute the identification module, the key module, the comparison module, and the addition module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a request to perform a full backup of a volume of data, and, in response to the request, 2) identify a file metadata index for a plurality of previous backups of the volume of data, each file metadata record within the file metadata index including a key uniquely identifying a corresponding file within a previous backup in the plurality of previous backups, an identifier of the previous backup, and file metadata of the corresponding file at the time of the previous backup, and, for each file within the volume of data, 3) add a current key uniquely identifying the file within the full backup and an identifier of the full backup to the file metadata index and 4) compare the current key to the file metadata index to determine whether the current key is represented in the file metadata index, and 5) add file metadata to the file metadata index for each file within the volume of data that is uniquely represented by the current key of the file within the file metadata index.

As will be explained in greater detail below, by generating keys based on file metadata for file metadata index records to ensure only a single instance of each version of the metadata of a file is stored across backups of a volume, the systems and methods described herein may significantly reduce computing resources consumed by a backup of the volume, including storage space and I/O resources for storing and indexing file metadata.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
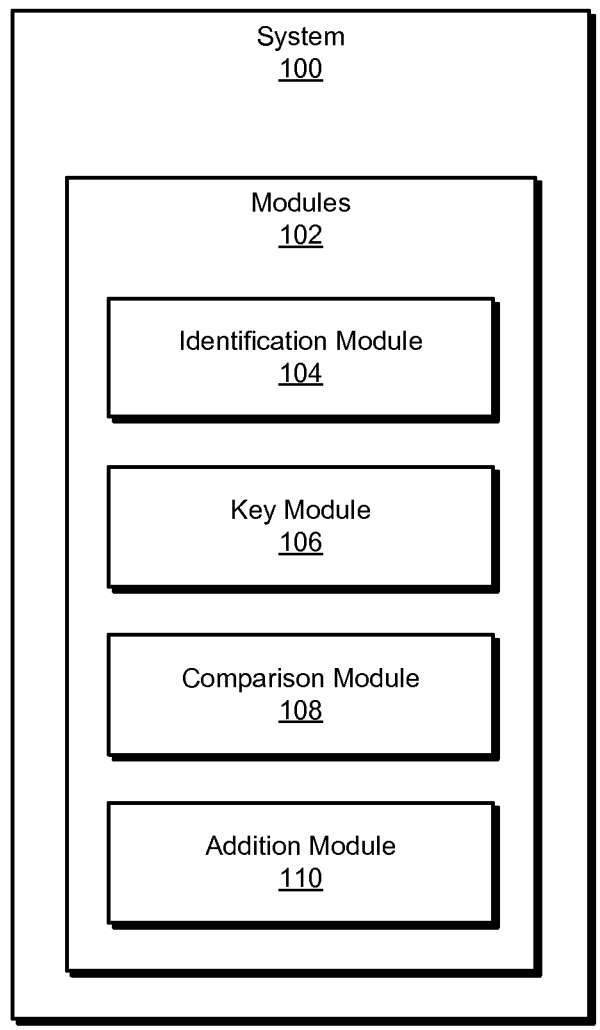
FIG. 1 is a block diagram of an exemplary system for indexing backup file metadata.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
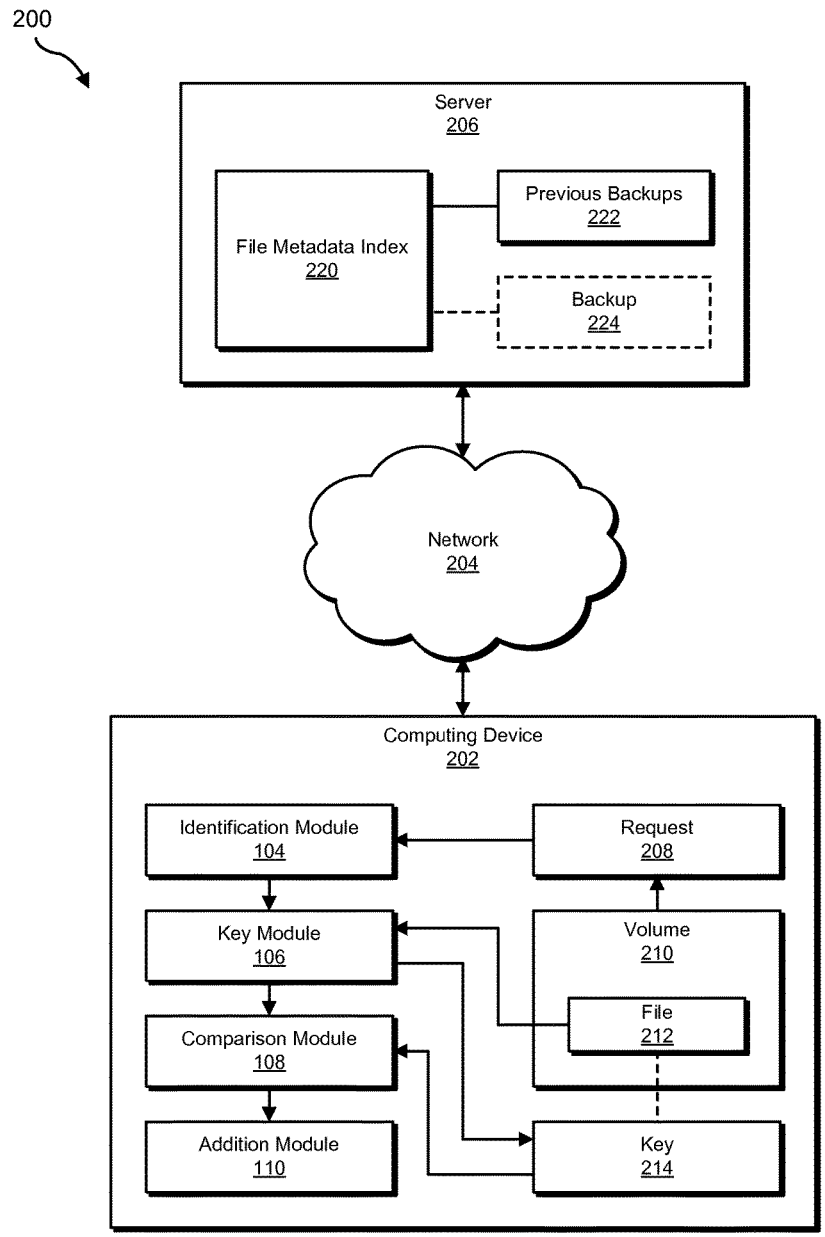
FIG. 2 is a block diagram of an exemplary system for indexing backup file metadata.
Figure 3:
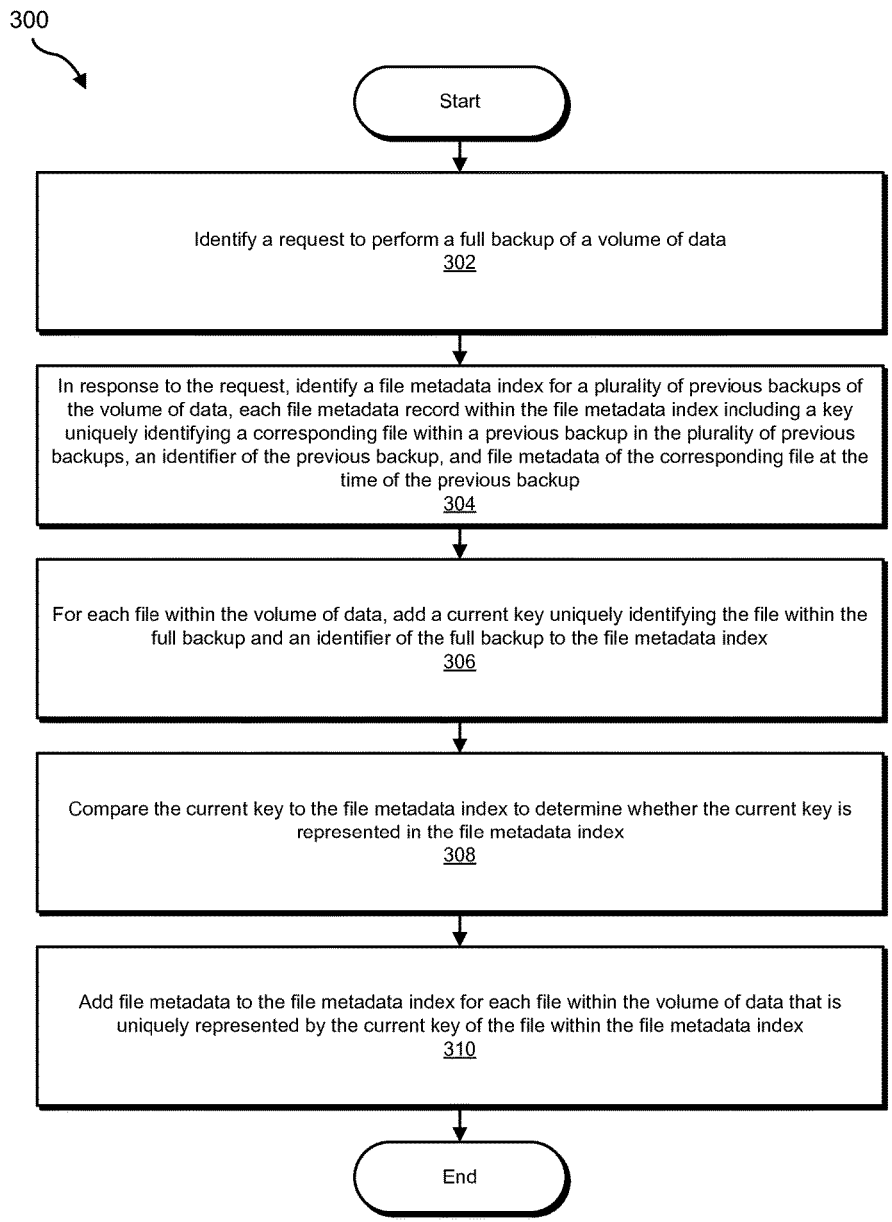
FIG. 3 is a flow diagram of an exemplary method for indexing backup file metadata.
Figure 4:
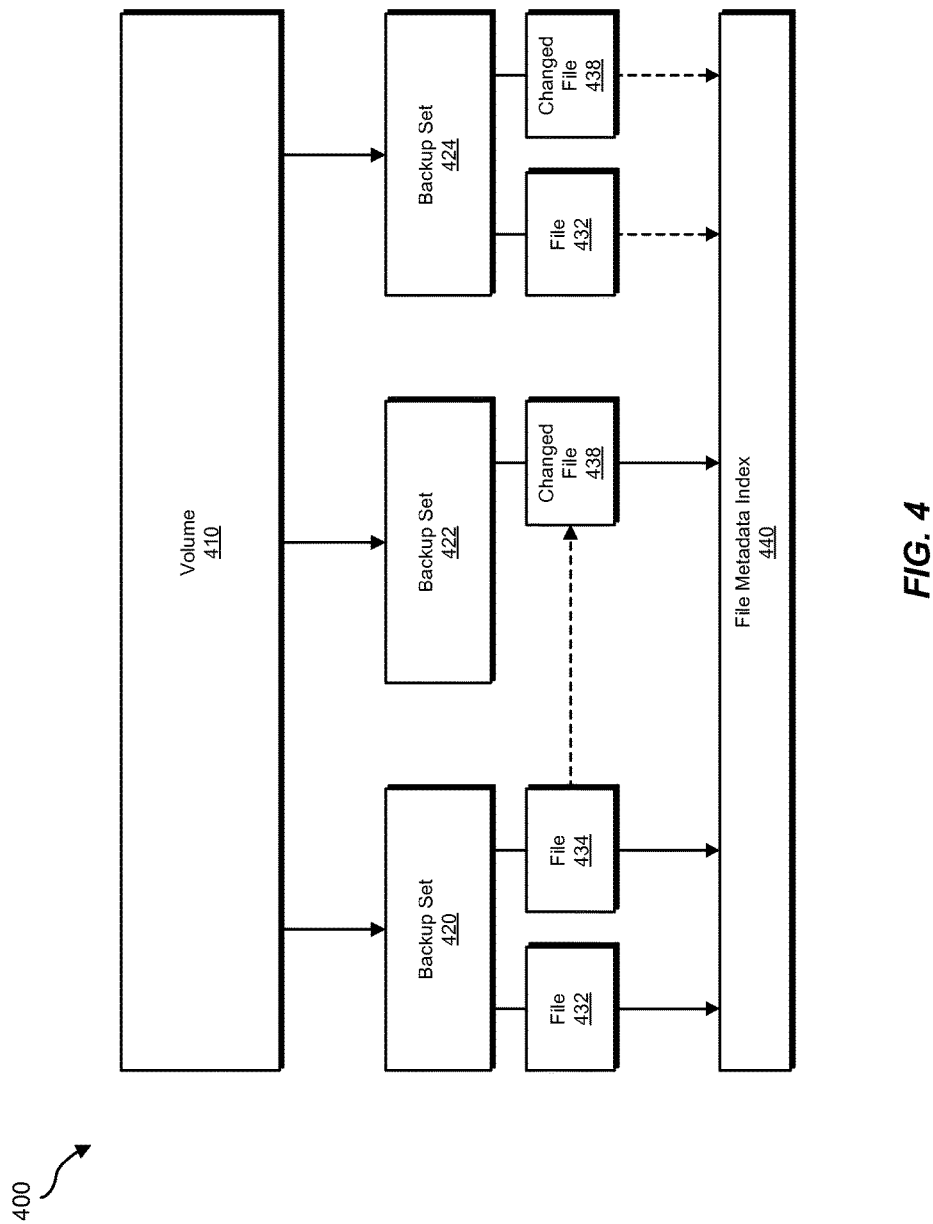
FIG. 4 is a block diagram of an exemplary system for indexing backup file metadata.

The following will provide, with reference to FIGS. 1, 2, and 4, detailed descriptions of exemplary systems for indexing backup file metadata. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for indexing backup file metadata. As illustrated in this figure, exemplary system 100 may include one or more modules 102 for performing one or more tasks. For example, and as will be explained in greater detail below, exemplary system 100 may include an identification module 104 programmed to identify a request to perform a full backup of a volume of data and, in response to the request, identify a file metadata index for a plurality of previous backups of the volume of data, each file metadata record within the file metadata index comprising a key uniquely identifying a corresponding file within a previous backup in the plurality of previous backups, an identifier of the previous backup, and file metadata of the corresponding file at the time of the previous backup. Exemplary system 100 may also include a key module 106 programmed to, for each file within the volume of data, add a current key uniquely identifying the file within the full backup and an identifier of the full backup to the file metadata index.

In addition, and as will be described in greater detail below, exemplary system 100 may include a comparison module 108 programmed to compare the current key to the file metadata index to determine whether the current key is represented in the file metadata index. Exemplary system 100 may also include an addition module 110 programmed to add file metadata to the file metadata index for each file within the volume of data that is uniquely represented by the current key of the file within the file metadata index. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204 for processing and/or retrieving information about backups.

In one embodiment, one or more of modules 102 from FIG. 1 may, when executed by at least one processor of computing device 202, facilitate computing device 202 in indexing backup file metadata. For example, and as will be described in greater detail below, one or more of modules 102 may cause computing device 202 to 1) identify a request 208 to perform a backup 224 of a volume 210, and, in response to request 208, 2) identify a file metadata index 220 for previous backups 222 of volume 210, each file metadata record within file metadata index 220 including a key uniquely identifying a corresponding file within a previous backup in previous backups 222, an identifier of the previous backup, and file metadata of the corresponding file at the time of the previous backup, and, for each file within volume 210 (e.g., a file 212), 3) add a key 214 uniquely identifying file 212 within the backup 224 and an identifier of backup 224 to file metadata index 220 and 4) compare key 214 to file metadata index 220 to determine whether key 214 is represented in file metadata index 220, and 5) add file metadata to file metadata index 220 for each file within volume 210 that is uniquely represented by the key of the file (e.g., key 214 of file 212) within file metadata index 220.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of processing, storing, indexing, and/or retrieving backups. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for indexing backup file metadata. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request to perform a full backup of a volume of data, and, in response to the request. For example, at step 302 identification module 104 may, as part of computing device 202 in FIG. 2, identify a request 208 to perform a backup 224 of a volume 210, and, in response to request 208.

As used herein, the term "volume" may refer to any discrete and/or defined collection of data. Examples of a volume include, without limitation, a file system partition, a physical disk, a logical volume, a database, and/or a collection of files defined by a backup policy. As used herein, the term "backup" may refer to any procedure to backup, duplicate, and/or protect data and/or the results of any such procedure. Accordingly, the phrase "full backup" may refer to any backup directed to the entirety of a volume.

Identification module 104 may identify the request in any suitable context. For example, identification module 104 may identify the request by reading a configuration of a backup system to perform the backup of the volume. Additionally or alternatively, identification module 104 may receive a message from the backup system identifying the volume for backup. In some examples, identification module 104 may operate as a part of the backup system and identify the volume scheduled for a full backup. In some examples, identification module 104 may identify a backup policy that identifies the volume as subject to a full backup.

FIG. 4 illustrates an exemplary system 400 for indexing backup file metadata. As shown in FIG. 4, exemplary system 400 may include a volume 410. Using FIG. 4 as an example, at step 302 identification module 104 may identify a request to create a backup set 424 of volume 410.

Returning to FIG. 3, at step 304 one or more of the systems described herein may identify a file metadata index for a plurality of previous backups of the volume of data, each file metadata record within the file metadata index including a key uniquely identifying a corresponding file within a previous backup in the plurality of previous backups, an identifier of the previous backup, and file metadata of the corresponding file at the time of the previous backup. For example, at step 304 identification module 104 may, as part of computing device 202 in FIG. 2, identify file metadata index 220 for previous backups 222 of volume 210, each file metadata record within file metadata index 220 including a key uniquely identifying a corresponding file within a previous backup in previous backups 222, an identifier of the previous backup, and file metadata of the corresponding file at the time of the previous backup.

As used herein, the term "file" may refer to any unit of data, including, without limitation, files, data objects, documents, emails, and databases. As used herein, the phrase "file metadata" may refer to any metadata that may be used to identify and/or describe files and which may be stored and/or indexed at the time of backup. Examples of file metadata may include, without limitation, file names, file paths, document titles, file creator identifiers, file owner identifiers, file creation times, file modification times, file access times, file permissions (e.g., access permissions, modification permissions, etc.), file sizes, tags, security attributes, reparse points, and the like.

As used herein, the phrase "file metadata index" may refer to any data structure, data collection, and/or database for storing and/or organizing file metadata (e.g., of backed up files). For example, the file metadata index may store file metadata not otherwise included in the backed up content of a file. Additionally or alternatively, the file metadata index may associate file metadata with files in a backup. In some examples, the file metadata index may include a plurality of subindices. For example, and as will be described in greater detail below, for scalability purposes, file metadata records may be distributed among two or more indices.

As used herein, the term "key" may refer to any attribute of a file, file metadata, and/or a file metadata record that may be used to uniquely identify a file (e.g., the current version of the file) within a given backup and/or across backups. For example, the key may include and/or be derived from a file path of the corresponding file, a modification time of the corresponding file, and/or an owner name of the corresponding file. For example, the key may include a concatenation of the file path, modification time, and owner name of the file. In some examples, the key may include a file path of the file and a metadata modification time of the file (e.g., a modification time that reflects a modification to any metadata of the file, including an owner of the file).

Identification module 104 may identify the file metadata index in any suitable context. In some examples, identification module 104 may identify the file metadata index after having generated and/or contributed to the file metadata index during an earlier process (e.g., during previous full and/or incremental backups). For example, one or more of the systems described herein (such as identification module 104) may identify a first request to perform a first full backup of the volume of data. In this example, one or more of the systems described herein may, in response to the first request, for each targeted file within the volume of data for the first full backup, generate an original key uniquely identifying the targeted file within the volume of data and create a record including the original key, an identifier of the first full backup, and file metadata for the targeted file with the file metadata index. For example, the systems and methods described herein may initially populate the file metadata index with file metadata records (e.g., storing preserved file metadata for each targeted file) associated with a key-identifier pair that uniquely identify each targeted file (e.g., in its current version at the time of the first full backup) and identify the first full backup. In this manner, these systems and methods may uniquely identify, within the file metadata index, each file within the volume at the time of the first full backup. Using FIG. 4 as an example, one or more of the systems described herein may identify a request to fully back up volume 410 (e.g., resulting in a backup set 420 including a file 432 and a file 434). These systems may then index file 432 in a file metadata index 440 using a key-identifier pair to identify file 432 and backup set 420, respectively, in association with stored file metadata of file 432. Likewise, these systems may index file 434 in file metadata index 440 using a key-identifier pair to identify file 434 and backup set 420 in association with the file metadata of file 434.

In some examples, one or more of the systems and methods described herein may have updated the file metadata index following an incremental backup of the volume. For example, one or more of the systems described herein (e.g., identification module 104) may identify a subsequent request to perform an incremental backup of the volume of data. One or more of these systems may then, in response to the subsequent request, for each identified file within the volume of data subject to the incremental backup, generate a key uniquely identifying the identified file within the volume of data and create a new record including the key, an identifier of the incremental backup, and file metadata for the identified file within the file metadata index. Using FIG. 4 as an example, one or more of the systems and methods described herein may identify a request to perform an incremental backup of volume 410 resulting in a backup set 422. Backup set 422 may include a changed file 438 representing a change to file 434. Accordingly, the systems and methods described herein may store file metadata for changed file 430 to add a key-identifier pair to file metadata index 440 for identifying changed file 438 and backup set 422 and associating the key-identifier pair with the stored file metadata.

Returning to FIG. 3, at step 306 one or more of the systems described herein may, for each file within the volume of data, add a current key uniquely identifying the file within the full backup and an identifier of the full backup to the file metadata index. For example, at step 306 key module 106 may, as part of computing device 202 in FIG. 2, for each file within volume 210 (e.g., file 212), add key 214 uniquely identifying file 212 within the backup 224 and an identifier of backup 224 to file metadata index 220.

Key module 106 may add the current key identifying the file in any suitable manner. As explained earlier, key module 106 may generate the current key using one or more metadata attributes of the file capable of, in combination, uniquely identifying the file in its current version. For example, key module 106 may generate the current key based on the file path of the file, the modification time of the file, and/or the owner name of the file.

Using FIG. 4 as an example, key module 106 may generate a key-identifier pair for file 432, including a key to uniquely identify file 432 (e.g., the same key used to identify file 432 in backup set 420) and a backup identifier to identify backup set 424. Likewise, key module 106 may generate a key-identifier pair for changed file 438, including a key to uniquely identify changed file 438 (e.g., the same key used to identify changed file 438 in backup set 422, but not the same key used to identify file 434 in backup set 420) and a backup identifier to identify backup set 424.

Returning to FIG. 3, at step 308 one or more of the systems described herein may, for each file within the volume of data, compare the current key to the file metadata index to determine whether the current key is represented in the file metadata index. For example, at step 308 comparison module 108 may, as part of computing device 202 in FIG. 2, compare key 214 to file metadata index 220 to determine whether key 214 is represented in file metadata index 220.

Comparison module 108 may compare the current key to the file metadata index in any suitable manner. For example, comparison module 108 may query the file metadata index for the current key, excluding the current full backup. Additionally or alternatively, comparison module 108 may query the file metadata index for the current key before key module 106 adds the current key to the file metadata index.

As mentioned earlier, in some examples the file metadata index may include a plurality of subindices (e.g., for scaling and/or performance purposes). For example, each subindex may correspond to a subset of possible file keys. In this example, key module 106 and/or comparison module 108 may select a subindex based on a property of the current key. For example, comparison module 108 may generate a hash of the current key and select the subindex by applying a mapping function to the hash (e.g., by dividing the hash space into ranges, by applying a modulus to the hash equivalent to the number of subindices, and/or by selecting a hash function that maps directly to the number of subindices).

Using FIG. 4 as an example, comparison module 108 may compare a key of file 432 to determine that the metadata of file 432 is already represented in file metadata index 440 (e.g., from backup set 420). Likewise, comparison module 108 may compare a key of changed file 438 to determine that the metadata of changed file 438 is already represented in file metadata index 440 (e.g., from backup set 422).

Returning to FIG. 3, at step 310 one or more of the systems described herein may add file metadata to the file metadata index for each file within the volume of data that is uniquely represented by the current key of the file within the file metadata index. For example, at step 310 addition module 110 may, as part of computing device 202 in FIG. 2, add file metadata to file metadata index 220 for each file within volume 210 that is uniquely represented by the key of the file (e.g., key 214 of file 212) within file metadata index 220.

Addition module 110 may add the file metadata to the file metadata index in any of a variety of ways. In some examples, addition module 110 may store the file metadata within the file metadata index. Additionally or alternatively, addition module 110 may store the file metadata in a separate repository and link to the file metadata in the repository from the file metadata index.

Addition module 110 may generally determine that the file is uniquely represented by the current key of the file within the file metadata index (e.g., that the file metadata index does not already include a record with the current key for a previous backup) based on the results of comparing the current key to the file metadata index. Accordingly, addition module 110 may ensure a single-instance storage of file metadata for each version of each file across multiple backups. Where an instance of the file metadata already exists within the file metadata index and/or a separate repository, addition module 110 may associate a key-identifier pair describing the current key and an identifier of the current full backup with the instance of the file metadata.

In some examples, the systems and methods described herein may also perform the full backup in response to the request. In these examples, these systems and methods may associate the full backup with the file metadata index. For example, these systems and methods may associate the full backup with a backup identifier used in key-identifier pairs to denote records of each file in each backup. In these examples, these systems and methods may later receive a restoration request to restore the volume of data from the full backup. These systems and methods may then restore each file within the volume of data from the full backup and restore file metadata for each file within the volume of data from the file metadata index (e.g., by identifying each file in the full backup based on the backup identifier and locating an associated stored file metadata instance).

As explained above, by generating keys based on file metadata for file metadata index records to ensure only a single instance of each version of the metadata of a file is stored across backups of a volume, the systems and methods described herein may significantly reduce computing resources consumed by a backup of the volume, including storage space and I/O resources for storing and indexing file metadata.

Figure 5:
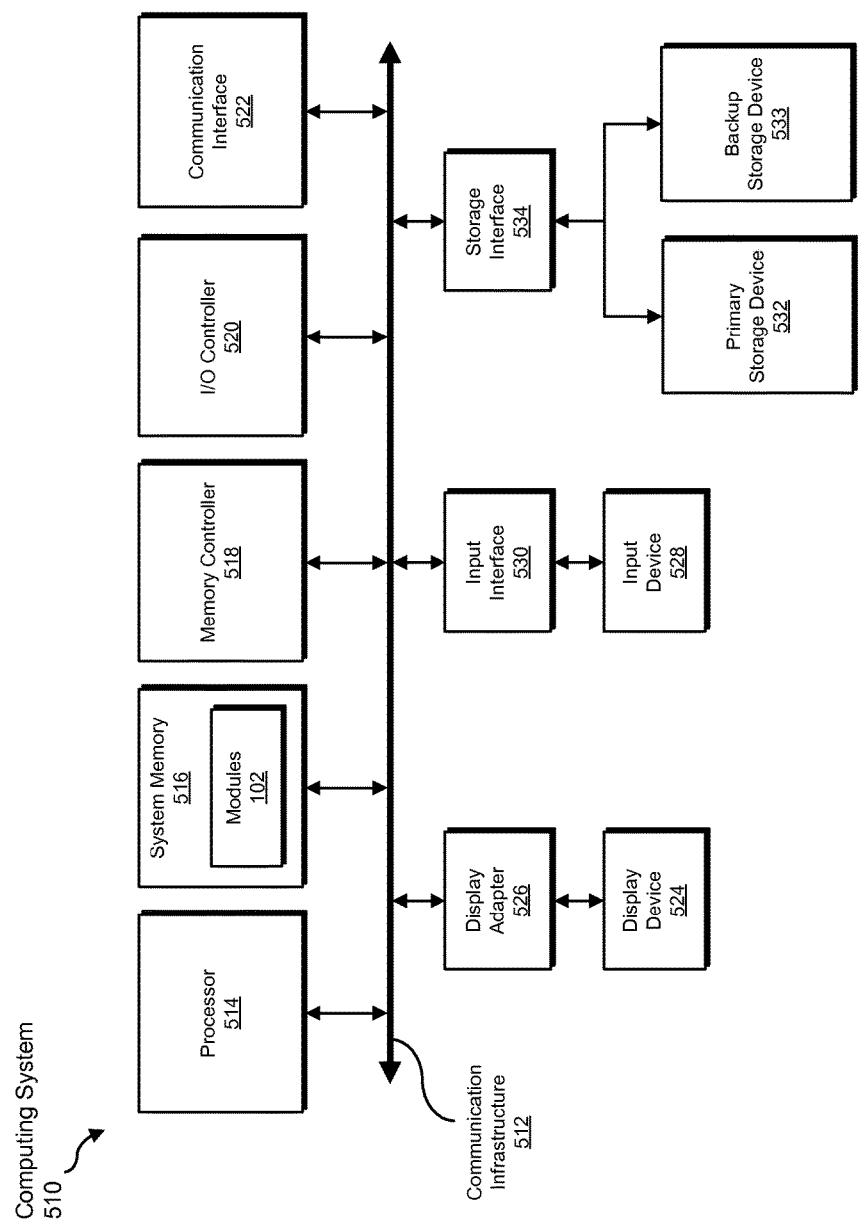
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, generating, creating, adding, comparing, selecting, performing, associating, receiving, and restoring steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
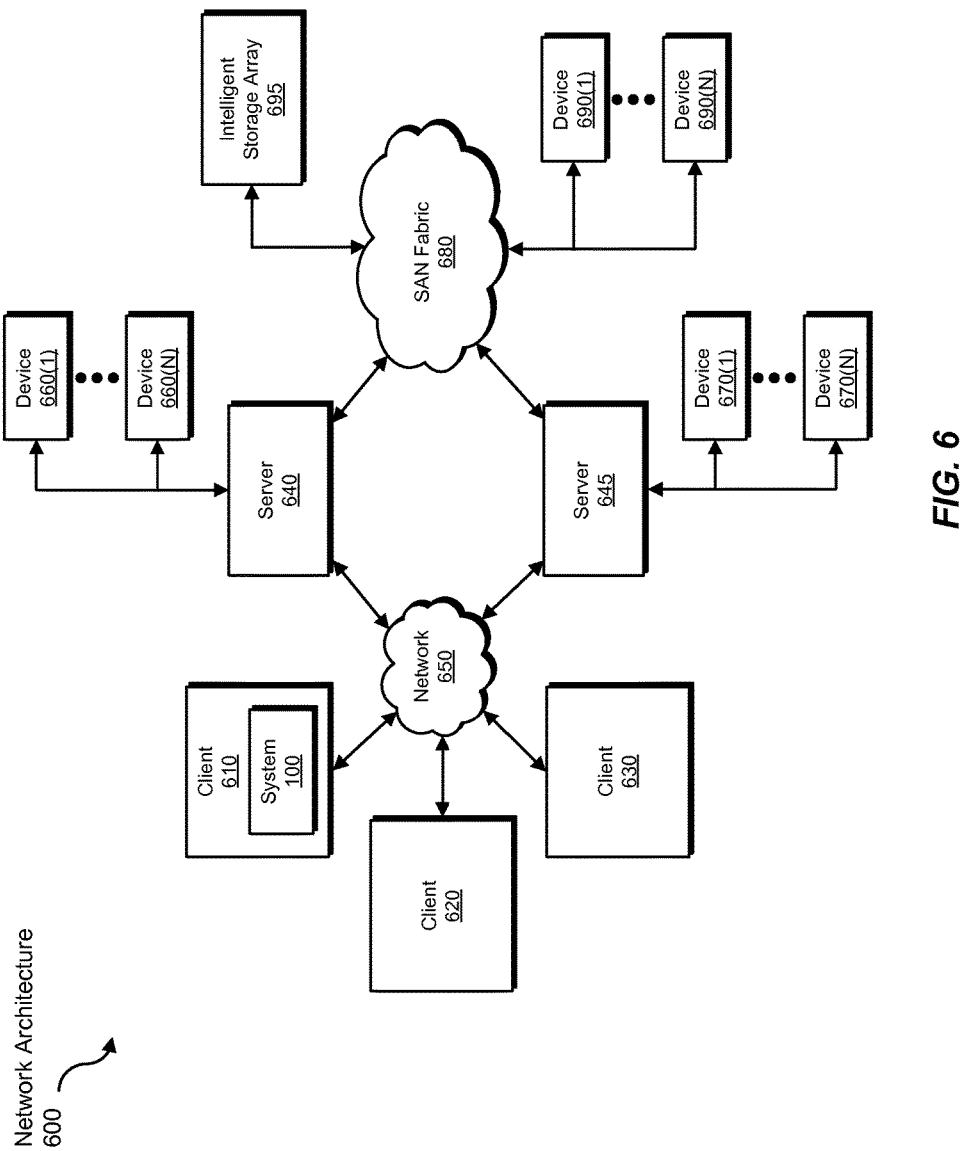
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, generating, creating, adding, comparing, selecting, performing, associating, receiving, and restoring steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for indexing backup file metadata.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a file metadata index into a single-instance-storage file metadata index. As another example, one or more of the modules recited herein may transform a computing system into a system for efficiently indexing backup file metadata.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for ensuring single-instance storage of file metadata across multiple backups, at least a portion of the method being performed by a computing device comprising at least one processor, the method comprising:

in response to identifying a request to perform a full backup of a volume of data, identifying a file metadata index, wherein:
the file metadata index includes file metadata records for files included in a plurality of previous backups of the volume of data;
each of the file metadata records comprises:
a key-identifier pair comprising both (1) a key uniquely identifying a corresponding file within one of the previous backups and (2) an identifier of the previous backup; and
file metadata of the corresponding file at the time of the previous backup; and
the file metadata index comprises a plurality of subindices, each of which comprises a subset of the file metadata records; and
updating the file metadata index to include file metadata records for both the plurality of previous backups and the full backup such that, for each file within the volume of data, only a single instance of each version of metadata of the file is stored across the plurality of previous backups and the full backup, wherein updating the file metadata index comprises, for each file within the volume of data:
  generating a current key for the file using a combination of at least two metadata attributes of the file capable of uniquely identifying the file in its current version;
  adding a new key-identifier pair to the file metadata index, the new key-identifier pair comprising both (1) the current key and (2) an identifier of the full backup;
  generating a hash of the current key and applying a mapping function to the hash to select, for the new key-identifier pair, a subindex from the plurality of subindices;
  comparing the current key to the key-identifier pairs already included in the selected subindex to determine whether the current key is already represented in the file metadata index;
  adding file metadata to the file metadata index for each file within the volume of data that is uniquely represented by the current key of the file within the selected subindex; and
  not adding file metadata to the file metadata index for each file within the volume of data that is already represented by one of the keys within the key-identifier pairs already included in the selected subindex.

2. The computer-implemented method of claim 1, wherein:
  the previous backups comprise at least one previous full backup; and
  the at least one previous full backup comprises a result of a procedure to duplicate data of an entirety of the volume of data.

3. The computer-implemented method of claim 2, further comprising:
  performing the full backup in response to the request to perform the full backup;
  associating the full backup with the file metadata index;
  receiving a restoration request to restore the volume of data from the full backup; and
  in response to the restoration request:
    restoring each file within the volume of data from the full backup; and
    restoring file metadata for each file within the volume of data from the file metadata index.

4. The computer-implemented method of claim 1, wherein the combination of metadata attributes comprises at least one of:
  a file path of the file;
  a modification time of the file; and
  an owner name of the file.

5. The computer-implemented method of claim 1, wherein:
  the previous backups of the volume of data comprise a first previous backup and a second previous backup;
  the first previous backup comprises an original file;
  the second previous backup comprises a modified version of the original file that includes one or more changes to the original file;
  the full backup comprises the modified version of the original file that has not been changed since the second previous backup was performed; and the method further comprises:
  at the time the first previous backup is performed, adding, to the file metadata index, a first key-identifier pair that comprises a first key uniquely identifying the original file;
  at the time the second previous backup is performed, adding, to the file metadata index, a second key-identifier pair that comprises a second key uniquely identifying the modified version of the original file; and
  in response to the request to perform the full backup:
    adding, to the file metadata index, a new key-identifier pair comprising a current key uniquely identifying the modified version of the original file;
    determining, by comparing the current key uniquely identifying the modified version of the original file to the key-identifier pairs already included in the file metadata index, that the current key uniquely identifying the modified version of the original file is already represented by the second key; and
    not adding metadata to the file metadata index for the modified version of the original file in response to determining that the current key uniquely identifying the modified version of the original file is already represented by the second key.

6. The computer-implemented method of claim 5, further comprising, at the time the second previous backup is performed:
  determining, by comparing the second key to the key-identifier pairs added to the file metadata index at the time the first previous backup was performed, that the modified version of the original file is uniquely represented by the second key; and
  adding metadata to the file metadata index for the modified version of the original file in response to determining that the modified version of the original file is uniquely represented by the second key.

7. The computer-implemented method of claim 1, wherein each of the file metadata records comprises file metadata used to at least one of:
  identify files within the volume of data; and
  describe files within the volume of data.

8. The computer-implemented method of claim 7, wherein the file metadata comprises at least one of:
  a file name;
  a document title;
  a file creator identifier;
  a file owner identifier;
  a file creation time;
  a file modification time;
  a file access time;
  a file permission;
  a file size;
  a tag;
  a security attribute; and
  a reparse point.

9. A system for ensuring single-instance storage of file metadata across multiple backups, the system comprising:
  an identification module, stored in memory, programmed to:
    identify a request to perform a full backup of a volume of data; and
    in response to the request to perform the full backup, identify a file metadata index, wherein:

the file metadata index includes file metadata records for files included in a plurality of previous backups of the volume of data;
each of the file metadata records comprises:
a key-identifier pair comprising both (1) a key uniquely identifying a corresponding file within one of the previous backups and (2) an identifier of the previous backup; and
file metadata of the corresponding file at the time of the previous backup; and
the file metadata index comprises a plurality of subindices, each of which comprises a subset of the file metadata records;
a key module, a comparison module, and an addition module, stored in memory, programmed to update the file metadata index to include file metadata records for both the plurality of previous backups and the full backup such that, for each file within the volume of data, only a single instance of each version of metadata of the file is stored across the plurality of previous backups and the full backup, wherein updating the file metadata index comprises, for each file within the volume of data:
generating a current key for the file using a combination of at least two metadata attributes of the file capable of uniquely identifying the file in its current version;
adding a new key-identifier pair to the file metadata index, the new key-identifier pair comprising both (1) current key and (2) an identifier of the full backup;
generating a hash of the current key and applying a mapping function to the hash to select, for the new key-identifier pair, a subindex from the plurality of subindices;
comparing the current key to the key-identifier pairs already included in the selected subindex to determine whether the current key is already represented in the file metadata index;
adding file metadata to the file metadata index for each file within the volume of data that is uniquely represented by the current key of the file within the selected subindex; and
not adding file metadata to the file metadata index for each file within the volume of data that is already represented by one of the keys within the key-identifier pairs already included in the selected subindex; and
at least one physical processor configured to execute the identification module, the key module, the comparison module, and the addition module.

10. The system of claim 9, further comprising a backup module programmed to:
perform the full backup in response to the request to perform the full backup; and
associate the full backup with the file metadata index.

11. The system of claim 10, further comprising a restoration module programmed to:
receive a restoration request to restore the volume of data from the full backup; and
in response to the restoration request:
restore each file within the volume of data from the full backup; and
restore file metadata for each file within the volume of data from the file metadata index.

12. The system of claim 9, wherein the combination of metadata attributes comprises at least one of:

a file path of the file;
a modification time of the file; and
an owner name of the file.

13. The system of claim 9, wherein the addition module adds file metadata to the file metadata index by storing the file metadata within the file metadata index.

14. The system of claim 9, wherein the addition module adds file metadata to the file metadata index by:
storing the file metadata in a separate repository; and
linking to the file metadata in the separate repository from the file metadata index.

15. The system of claim 9, wherein applying the mapping function to the hash comprises applying a modulus to the hash equivalent to the number of subindices.

16. The system of claim 15, wherein applying the mapping function to the hash comprises at least one of:
dividing a hash space associated with the hash into ranges; and
selecting a hash function that maps directly to the number of subindices.

17. A non-transitory computer-readable-storage medium comprising one or more computer-executable instructions that, when executed by at least one processor of a computing device, cause the computing device to:
in response to identifying a request to perform a full backup of a volume of data, identify a file metadata index, wherein:
the file metadata index includes file metadata records for files included in a plurality of previous backups of the volume of data;
each of the file metadata records comprises:
a key-identifier pair comprising both (1) a key uniquely identifying a corresponding file within one of the previous backups and (2) an identifier of the previous backup; and
file metadata of the corresponding file at the time of the previous backup; and
the file metadata index comprises a plurality of subindices, each of which comprises a subset of the file metadata records; and
update the file metadata index to include file metadata records for both the plurality of previous backups and the full backup such that, for each file within the volume of data, only a single instance of each version of metadata of the file is stored across the plurality of previous backups and the full backup, wherein updating the file metadata index comprises, for each file within the volume of data:
generating a current key for the file using a combination of at least or more metadata attributes of the file capable of uniquely identifying the file in its current version;
adding a new key-identifier pair to the file metadata index, the new key-identifier pair comprising both (1) the current key and (2) an identifier of the full backup;
generating a hash of the current key and applying a mapping function to the hash to select, for the new key-identifier pair, a subindex from the plurality of subindices;
comparing the current key to the key-identifier pairs already included in the selected subindex to determine whether the current key is already represented in the file metadata index;

adding file metadata to the file metadata index for each file within the volume of data that is uniquely represented by the current key of the file within the selected subindex; and not adding file metadata to the file metadata index for each file within the volume of data that is already represented by one of the keys within the key-identifier pairs already included in the selected subindex.

18. The non-transitory computer-readable-storage medium of claim 17, wherein the one or more computer-executable instructions further cause the computing device to:

perform the full backup in response to the request; and
associate the full backup with the file metadata index.

19. The non-transitory computer-readable-storage medium of claim 18, wherein the one or more computer-executable instructions further cause the computing device to:

receive a restoration request to restore the volume of data from the full backup; and
in response to the restoration request:
  restore each file within the volume of data from the full backup; and
  restore file metadata for each file within the volume of data from the file metadata index.

20. The non-transitory computer-readable-storage medium of claim 17, wherein the combination of metadata attributes comprises at least one of:

a file path of the file;
a modification time of the file; and
an owner name of the file.

\* \* \* \* \*